United States Patent
Carlson et al.

(10) Patent No.: US 7,908,877 B2
(45) Date of Patent: Mar. 22, 2011

(54) VEHICLE HVAC CONTROL

(75) Inventors: Michael H. Carlson, Madison Heights, MI (US); Lawrence P. Ziehr, Clarkston, MI (US); Todd M. Tumas, Taylor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 12/175,513

(22) Filed: Jul. 18, 2008

(65) Prior Publication Data

US 2010/0011789 A1   Jan. 21, 2010

(51) Int. Cl.
*F25B 49/00* (2006.01)
*B60W 20/00* (2006.01)

(52) U.S. Cl. .................. 62/157; 62/231; 180/65.27
(58) Field of Classification Search ............ 62/133, 62/157, 231, 236; 180/53.8, 65.27
See application file for complete search history.

(56) References Cited

U.S. PATENT DOCUMENTS

| | | | |
|---|---|---|---|
| 2002/0043072 A1* | 4/2002 | Hamachi et al. | 62/230 |
| 2007/0186573 A1* | 8/2007 | Ziehr et al. | 62/236 |

* cited by examiner

*Primary Examiner* — Marc E Norman

(57) ABSTRACT

A method of controlling a HVAC system for a hybrid vehicle having a refrigerant compressor driven by an engine is disclosed. The method may comprise: determining a requested air conditioning operating point for a passenger compartment; estimating a time to reach the requested operating point; based on the previous steps, estimating a maximum allowed compressor off time; determining if the allowed compressor off time is greater than a minimum engine off time; if the allowed compressor off time is greater than the engine off time, determining if the vehicle is entering an allowable engine off mode; if so, commencing engine shut-off mode; if engine shut-off is anticipated, prior to commencing the shut-off mode, adjusting the HVAC system to maximize cooling of the passenger compartment with minimum energy usage; and if the engine shut-off is commenced, monitoring the HVAC system to determine when engine restart is needed to maintain comfort.

18 Claims, 5 Drawing Sheets

VEHICLE HVAC CONTROL

BACKGROUND OF INVENTION

The present invention relates generally to heating, ventilation and air conditioning (HVAC) systems for vehicles, and more particularly to HVAC systems employed with hybrid vehicles having belt driven refrigerant compressors.

On vehicles that employ internal combustion engines, some hybrid versions shut off the engine while stopped at a traffic light in order to improve fuel economy. For such vehicles that also employ a belt driven refrigerant compressor (i.e., the belt driven by the engine), the compressor cannot operate while the engine is off. So, while a vehicle is waiting at a stop light on a hot day, the requirement to keep passengers thermally comfortable is in direct conflict with increasing fuel economy.

Some have addressed this concern by using an electric driven compressor, which can operate with the engine off. However, the electric compressor operates at a higher cost in energy and materials due to the complexity and additional stages in power transfer. This higher cost may be unacceptable for certain vehicles.

SUMMARY OF INVENTION

An embodiment contemplates a method of controlling a HVAC system for a hybrid vehicle having a refrigerant compressor driven only by an engine, the method comprising the steps of: determining a requested air conditioning operating point for a passenger compartment; estimating a time to reach the requested air conditioning operating point; based on the previous two steps, estimating a maximum allowed compressor off time; determining if the maximum allowed compressor off time is greater than a minimum allowed engine off time; if the maximum allowed compressor off time is greater than the minimum allowed engine off time, determining if the vehicle is entering an allowable engine off mode; if the vehicle is in the allowable engine off mode, commencing engine shut-off mode; if engine shut-off mode is anticipated, prior to commencing the engine shut-off mode, adjusting at least one component of the HVAC system to maximize cooling of the passenger compartment with minimum energy usage; and if the engine shut-off mode is commenced, monitoring the HVAC system to determine when engine restart is needed to maintain thermal comfort in the passenger compartment.

An embodiment contemplates a method of controlling a HVAC system for a hybrid vehicle, the method comprising the steps of: determining an engine temperature requirement; determining an engine temperature parameter; comparing the engine temperature parameter to the engine temperature requirement; if the engine temperature parameter is greater than the engine temperature requirement, determining that a heating engine shut-off requirement is satisfied; if the heating shut-off requirement is satisfied and the vehicle is entering an allowable engine off mode, commencing an engine shut-off mode; if the heating engine shut-off requirement is satisfied, adjusting at least one component of the HVAC system to maximize heating of a passenger compartment with minimum energy usage prior to commencing the engine shut-off mode; and if the engine shut-off mode is commenced, monitoring the HVAC system to determine when engine restart is needed to maintain thermal comfort in the passenger compartment.

An advantage of an embodiment is that the HVAC control strategy will meet thermal comfort requirements while maximize fuel savings by reducing compressor operation of a belt driven compressor, which allows for maximum engine off time at vehicle idle in a hybrid vehicle. This is achieved while minimizing fogging, re-fogging, musty smell/humid air discharges, and excessive temperature swings in the passenger compartment. Also, maximum engine off time is achieved while providing heat to the passenger compartment.

DETAILED DESCRIPTION

Figure 1:
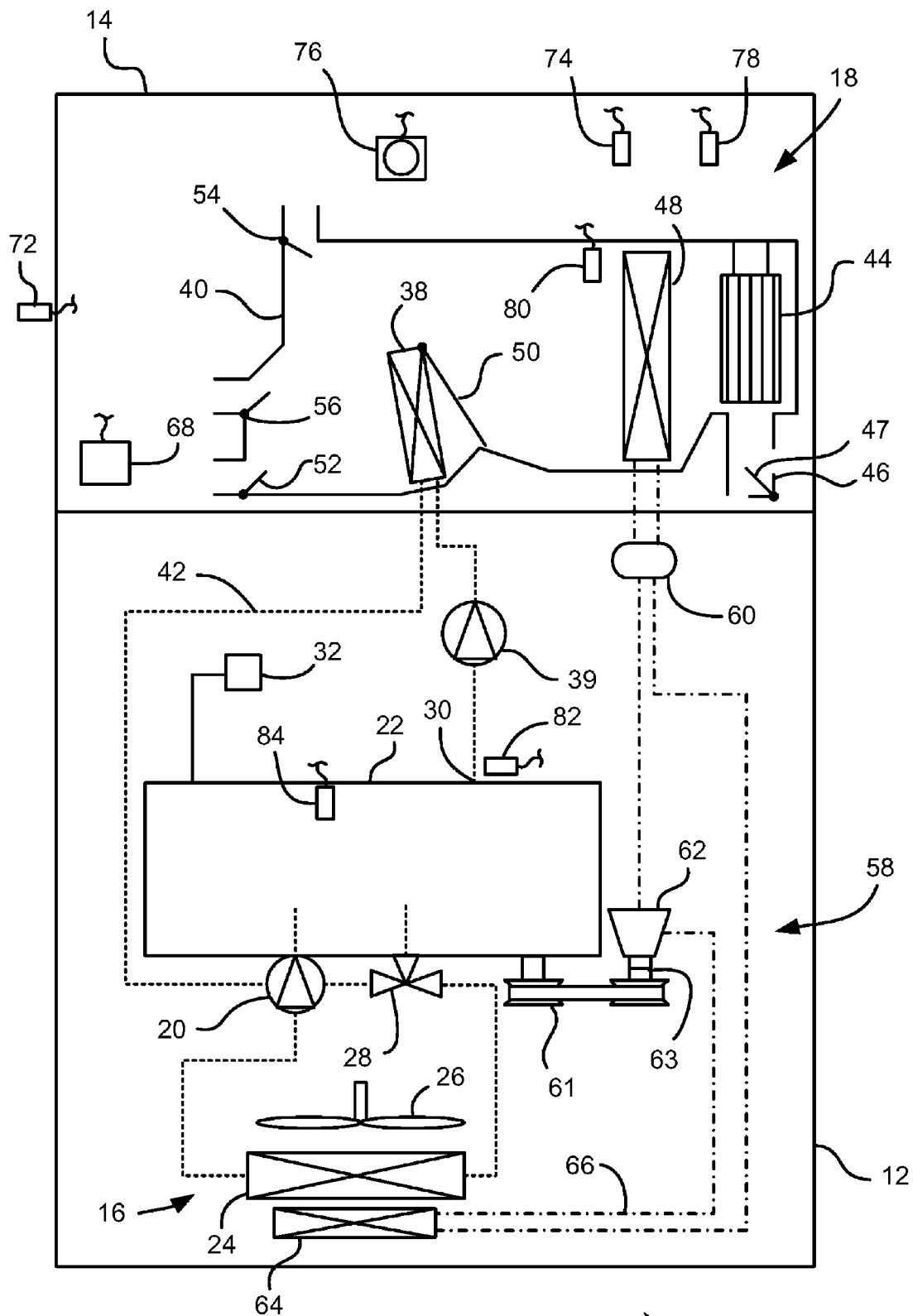
FIG. 1 is a schematic diagram of a vehicle including a HVAC system.

Referring to FIG. 1, a portion of an automotive vehicle, indicated generally at 10, is shown. The vehicle 10 may have a hybrid powertrain including an internal combustion engine 22. The vehicle 10 includes an engine compartment 12 and a passenger compartment 14. Within the compartments 12, 14 are an engine cooling system 16 and a heating, ventilation and air conditioning (HVAC) system 18.

The engine cooling system 16 includes a water pump 20 that pushes water through the engine 22 and other portions of the engine cooling system 16. This water pump 20 may be driven by the engine 22. A radiator 24 and fan 26 are employed for removing heat from the engine coolant. A thermostat 28 may be employed in a conventional fashion for selectively blocking the flow of coolant through the radiator 24 when the coolant is below a desired operating temperature.

A powertrain controller 32 controls the engine operation, including switching the engine operation between a normal operating mode and a deactivation (engine shut-off) mode, such as, for example, when a vehicle is stopped at a traffic light.

A heater core outlet 30 from the engine 22 directs coolant to a heater core 38, located in a HVAC module 40. Optionally, an electrically driven auxiliary coolant pump 39 may selectively pump coolant from the engine 22 to the heater core 38. A coolant line 42 directs coolant from the heater core 38 to an inlet to the water pump 20. The dashed lines shown in FIG. 1 represent coolant lines through which engine coolant flows.

The HVAC system 18 includes the HVAC module 40, within which is located a blower 44 for drawing in air through an air inlet 46 past a recirculation door 47 and directing it through an evaporator 48. Downstream of the evaporator 48 is the heater core 38, which has a blend door 50 located on its upstream side that selectively directs air around or through the heater core 38. The HVAC module 40 may also include a defrost outlet and door 52, a floor outlet and door 54, and a chest height outlet and door 56, which direct air into different portions of the passenger compartment 14, depending upon the particular HVAC operating mode.

A cooling portion 58 of the HVAC system 18 may include the evaporator 48, a thermal expansion valve 60, a refrigerant compressor 62, and a condenser 64 connected together via refrigerant lines 66. The dash-dot lines shown in FIG. 1 represent refrigerant lines through which refrigerant flows. The compressor 62 is driven by the engine 22, via a belt and pulley assembly 61. A clutch 63 may be employed to selectively connect and disconnect the compressor 62 from the driving torque of the belt and pulley assembly 61, or, alternatively, the compressor 62 may be a variable capacity compressor.

The HVAC system 18 also includes a HVAC controller 68 that communicates with the powertrain controller 32 and controls the compressor 62 (or the compressor clutch as the case may be), as well as the blower 44, blend door 50 and the outlet doors 52, 54, 56. The powertrain controller 32 may also control the speed of the fan 26. Accordingly, various portions of the HVAC system 18 and engine 22 can be automatically controlled to optimize vehicle fuel economy while providing for adequate heating and air conditioning to the passenger compartment 14. The flow charts of FIGS. 2A-3B illustrate a method for operating the HVAC system 18 of FIG. 1 to allow for adequate thermal comfort in the passenger compartment 14 while maximizing the vehicle fuel economy by maximizing the engine off time at idle.

The HVAC system 18 may also include various sensors for detecting a temperature or pressure at certain points in the system. For example, the HVAC system 18 may include an ambient air temperature sensor 72 for measuring ambient air temperature outside of the vehicle, a passenger compartment air temperature sensor 74 for measuring the air temperature in the passenger compartment 14, and a solar load sensor 76 for measuring a solar load on the passenger compartment 14. A humidity sensor 78 may be included to measure a humidity level in the passenger compartment 14. An evaporator air temperature sensor 80 may be employed to measure the temperature of air flowing out of the evaporator 26. Also, a coolant temperature sensor 82 may be employed to measure a temperature of coolant flowing to the heater core 38, and another temperature sensor 84 may be employed to obtain an engine temperature, which may measure engine oil temperature.

FIGS. 2A-3B are flow charts illustrating a method for operating the HVAC system 18 (in coordination with the engine operation) of FIG. 1 to provide heat to the passenger compartment 14. When operating a hybrid automotive vehicle, a compromise has to be made between maximizing the fuel economy and operating the HVAC system 18 to maintain thermal comfort for the passengers.

Figure 2A:
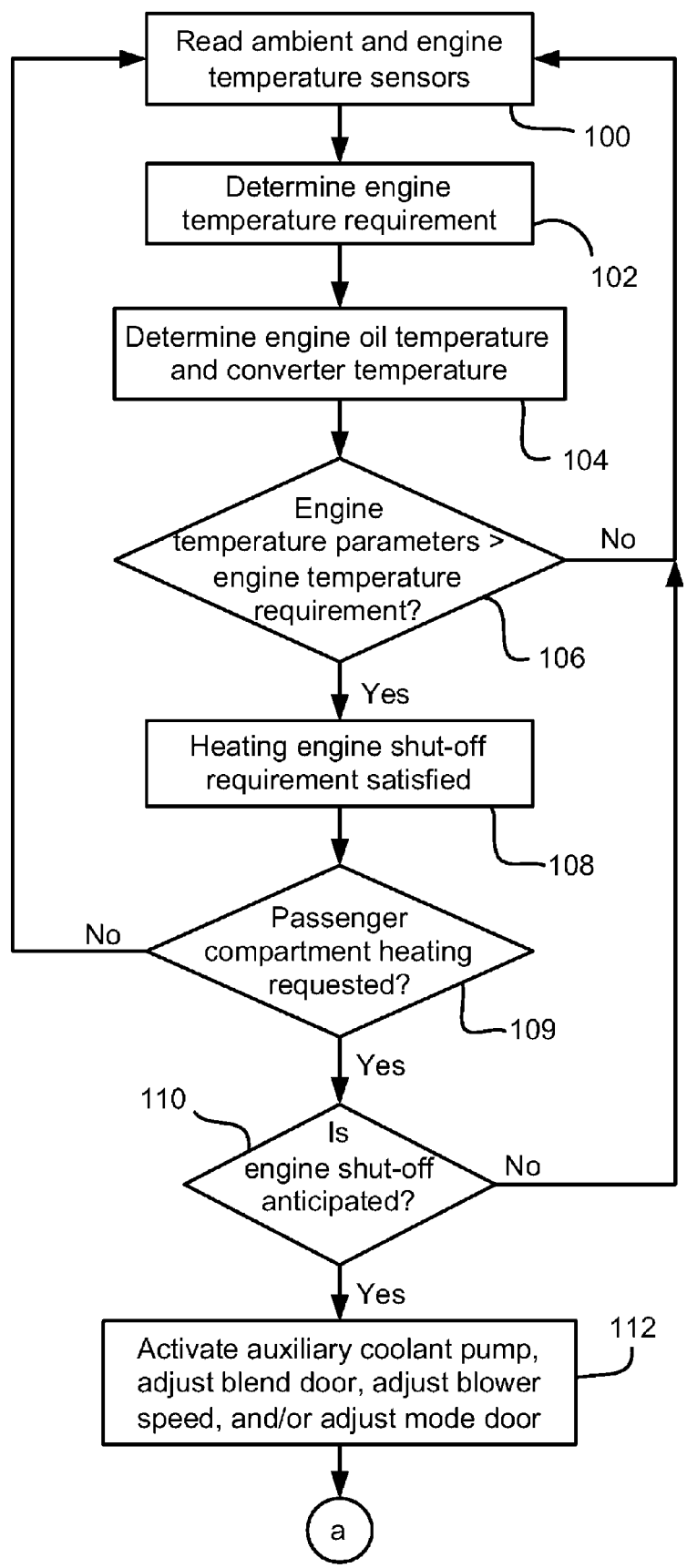
FIGS. 2A-2B show a flow chart illustrating a portion of a method for operating the HVAC system of FIG. 1.
Figure 2B:
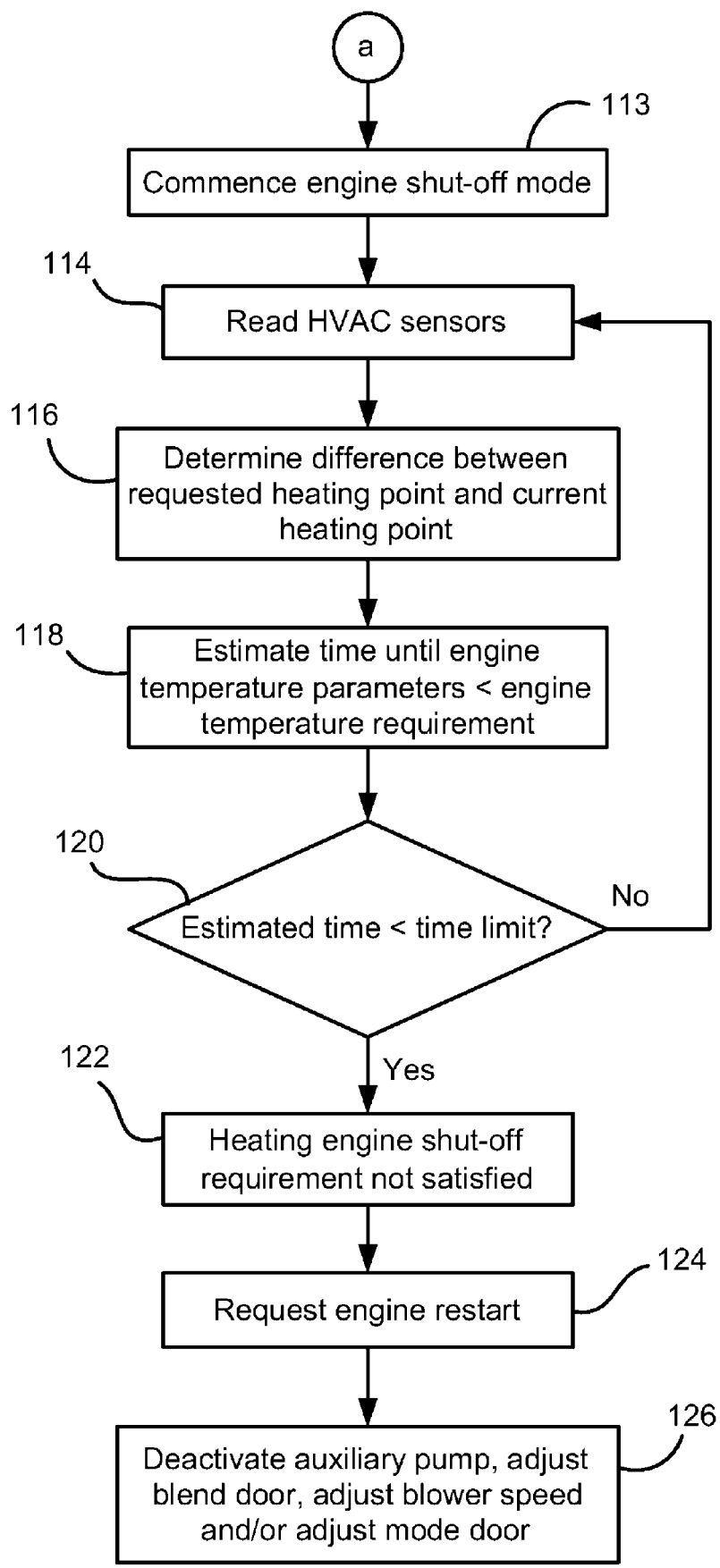

FIGS. 2A-2B show a flow chart illustrating a method for managing the heating operations of the HVAC system 18 of FIG. 1. Ambient temperature and engine temperature are read, block 100. The ambient temperature sensor 72 and the coolant temperature sensor 82 may be employed for determining these temperature readings. An engine temperature requirement is determined, block 102. This engine temperature requirement is the temperature needed to allow for adequate heat to be supplied to the heater core 38 from the engine coolant. An engine oil temperature and a catalytic converter temperature are determined, block 102. The oil temperature may be determined from the engine temperature sensor 84, while the converter temperature may be estimated based on, for example, engine operating conditions and run time as well as the ambient temperature. The current thermal conditions of the engine 22 are the engine thermal parameters, which are indicative of the heat that can be removed from the engine 22 to provide heat to the passenger compartment 14. The engine temperature parameters are compared to the engine temperature requirement, block 106. If the engine temperature parameters are not greater than the engine temperature requirement, then the process starts again. If the engine temperature parameters are greater than the engine temperature requirement, then the heating engine shut-off requirement is satisfied, block 108.

The heating engine shut-off requirement is just one requirement that needs to be met in order to allow engine shut-off at vehicle idle. Another condition will be discussed below relative to FIGS. 3A and 3B. And, of course, the general vehicle and battery pack conditions need to be met that allow for engine shut-off at idle. For example, there may be a minimum engine-on time before another shut-off is allowed and the battery may require a minimum charge to allow for engine shut-off.

A determination is made whether passenger compartment heating is requested, block 109. If not, the process starts again. If passenger compartment heating is requested, then a determination is made if engine shut-off is anticipated, block 110. If not, the process starts again. If engine shut-off is anticipated, then adjustments are made to the HVAC system 18 to account for the fact that passenger compartment heating is will be provided while the engine 22 is off. This may include, activating the auxiliary coolant pump 39 to pump warm coolant from the engine 22 through the heater core 38, adjusting the blend door to direct all air flow through the heater core 38, adjusting the blower speed, and/or adjusting the mode door 47 to recirculate air flow, block 112. These changes are directed to maximizing the heat available for passenger compartment heating during the periods of engine off vehicle operation. Then, engine shut-off mode is commenced, block 113.

While providing heat to the passenger compartment 14 during an engine off condition, the method assures that adequate heat can continue to be supplied to the passenger compartment 14. The HVAC sensors are read, block 114. The HVAC sensors to be read are those that are indicative of the ability to continue providing adequate heat to the passenger compartment 14 while the engine 22 remains off. A difference between a requested heating point and a current heating point is determined, block 116, in order to determine how far the passenger compartment temperature is from a desired temperature range. An estimated time until the engine temperature parameters are less than the engine temperature requirements is calculated, block 118. The estimated time is compared to a time limit, block 120. The time limit is the amount of time that the engine 22 would need to operate after restarting to provide the heat needed for the heater core 38. Thus, the estimation is monitored and if the thermal comfort limits will be exceeded, the request for an engine restart is sent in time to allow the engine 22 to be restarted and the system returned to normal operation before the threshold is reached.

If the estimated time is not less than the time limit, then the process returns to block 114. If the estimated time is less than the time limit, then the heating engine shut-off requirement is no longer satisfied, block 122. Once this engine shut-off requirement is not satisfied, an engine restart is requested, block 124. With the engine 22 now operating, the auxiliary pump 39 may be deactivated, and the blend door 50, blower speed and/or the mode door 47 may be adjusted, block 126, to pre-engine shut-off conditions.

Figure 3A:
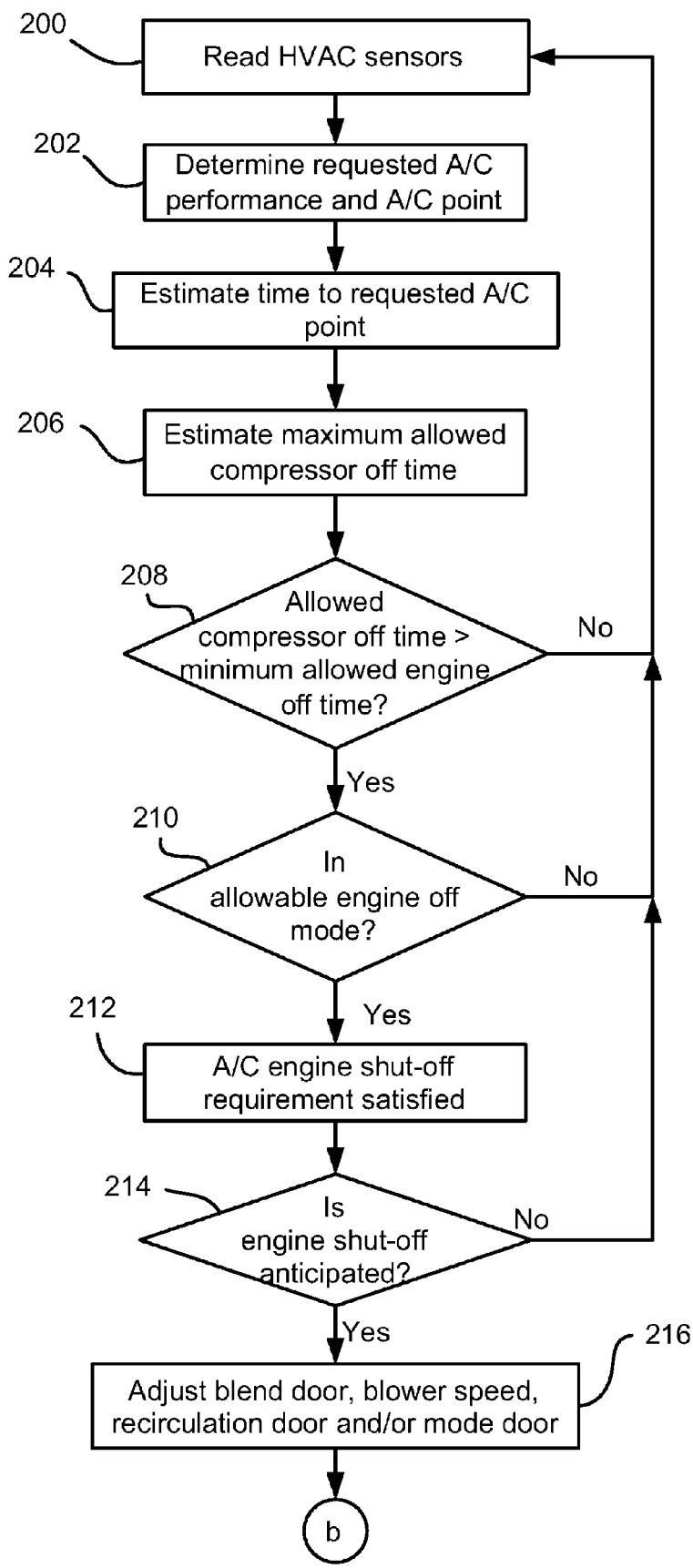
FIGS. 3A-3B show a flow chart illustrating a portion of a method for operating the HVAC system of FIG. 1.
Figure 3B:
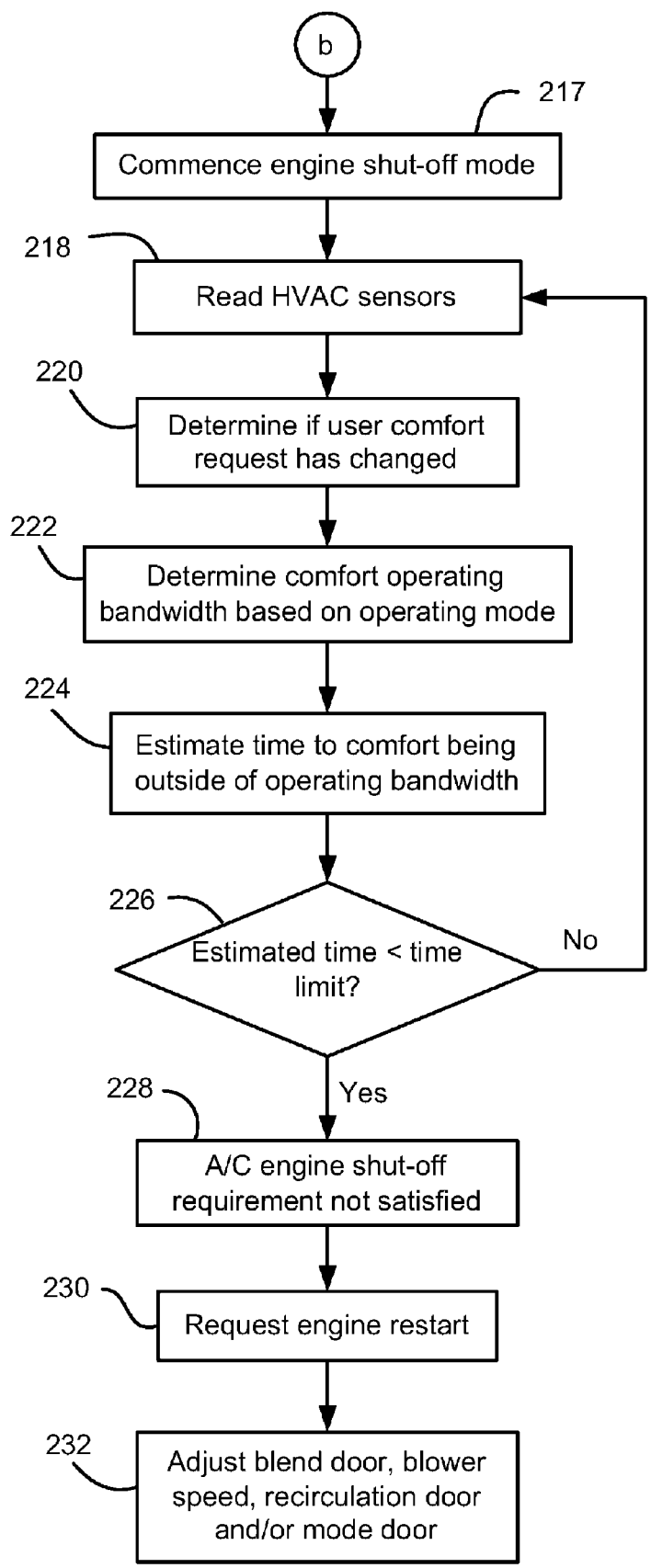

Simultaneously with the method shown in FIGS. 2A-2B, a method for controlling the air conditioning operations may be operated. FIGS. 3A-3B show a flow chart illustrating a method for managing the air conditioning (A/C) operations, which may include passenger compartment cooling, as well as defog/defrost operations, for the vehicle of FIG. 1.

HVAC sensors are read, block 200. A requested A/C performance and requested A/C operating point are read, block 202. The requested A/C performance may include maximum A/C, high fuel economy A/C performance, defogging prevention and/or defrost operation. The requested A/C operating point is the thermal comfort range requested by the vehicle occupant. A time to reaching the requested A/C point is estimated, block 204. Also, a maximum allowed refrigerant compressor off time is estimated, block 206. This is the time the compressor may be off while still approaching or maintaining the thermal comfort in the passenger compartment 14 within an acceptable range around the requested A/C point. The compressor off time may be zero under some operating conditions.

The allowed compressor off time is then compared to the minimum allowed engine off time, block 208. The minimum allowed engine off time is the minimum amount of time for which it is advantageous to turn the engine off. If the allowed compressor off time is not greater than the minimum allowed engine off time, then the process returns to block 200. If the allowed compressor off time is greater than the minimum allowed engine off time, then a determination is made as to whether the vehicle is in an allowable engine off mode, block 210. That is, the general vehicle and battery pack conditions need to be met that allow for engine shut-off at idle, as well as the conditions relating to the method of FIGS. 2A-2B. If not in allowable engine off mode, then the process returns to block 200. If in allowable engine off mode, then the A/C engine shut-off requirement is satisfied, block 212. If engine shut-off is not anticipated, block 214, due to other operating conditions preventing an engine shut-off mode, then the process returns to block 200. If engine shut-off is anticipated, then the blend door 50, speed of the blower 44, and/or mode door 47 are adjusted, block 216. These adjustments may include moving the blend door 50 to divert all air flow to bypass the heater core 38, and moving the mode door 47 to recirculate air rather than drawing in fresh air. Then, engine shut-off mode is commenced, block 217.

While providing A/C (or defrost/defog) to the passenger compartment 14 during an engine off condition, the method assures that adequate A/C can continue to be supplied to the passenger compartment 14. The HVAC sensors are read, block 218. The HVAC sensors to be read are those that are indicative of the ability to continue providing adequate A/C to the passenger compartment 14 while the engine 22 remains off. These may include, for example, ambient temperature, relative humidity, and solar load and direction. A determination is made whether the user comfort request has changed, block 220. A change may occur when an occupant changes the temperature or operating mode of the HVAC system 18. Also, a comfort operating bandwidth based on the operating mode is determined, block 222. The comfort operating bandwidth is the acceptable range of thermal comfort provided to the occupants in the passenger compartment 14. A time to thermal comfort being outside of the comfort operating bandwidth is estimated, block 224.

A comparison is then made between the estimated time and a time limit, block 226. The time limit is an amount of time that the engine 22 would need to operate after restarting to provide the chilled refrigerant needed for the evaporator 48. Thus, the estimation is monitored and if the comfort operating bandwidth will be exceeded, the request for an engine restart is sent in time to allow the engine 22 to be restarted and the system returned to normal operation before the threshold is reached. If the estimated time is not less than the time limit, then the process returns to block 218. If the estimated time is less than the time limit, then the A/C engine shut-off requirement is not satisfied, block 228. An engine restart is requested, block 230. In addition, the blend door 50, blower speed, recirculation door 47 and mode doors 52, 54, 56 are returned to the operating states before the engine shut-off condition.

While certain embodiments of the present invention have been described in detail, those familiar with the art to which this invention relates will recognize various alternative designs and embodiments for practicing the invention as defined by the following claims.

What is claimed is:

1. A method of controlling a HVAC system for a hybrid vehicle having a refrigerant compressor driven only by an engine, the method comprising the steps of:
   (a) determining a requested air conditioning operating point for a passenger compartment;
   (b) estimating a time to reach the requested air conditioning operating point;
   (c) based on steps (a) and (b), estimating a maximum allowed compressor off time;
   (d) determining if the maximum allowed compressor off time is greater than a minimum allowed engine off time;
   (e) if the maximum allowed compressor off time is greater than the minimum allowed engine off time, determining if the vehicle is entering an allowable engine off mode;
   (f) if the vehicle is in the allowable engine off mode, commencing engine shut-off mode;
   (g) if the engine shut-off mode is anticipated, prior to commencing the engine shut-off mode, adjusting at least one component of the HVAC system to maximize cooling of the passenger compartment with minimum energy usage; and
   (h) if the engine shut-off mode is commenced, monitoring the HVAC system to determine when engine restart is needed to maintain thermal comfort in the passenger compartment.

2. The method of claim 1 wherein steps (a) and (b) are further defined by detecting an ambient temperature around the vehicle, detecting a relative humidity in the passenger compartment and detecting a solar load in the passenger compartment.

3. The method of claim 1 wherein step (g) is further defined by adjusting at least one of a blend door upstream of a heater core, a speed of a HVAC blower, a recirculation door and a mode door.

4. The method of claim 1 wherein step (h) is further defined by: determining a comfort operating thermal bandwidth based on a HVAC operating mode, estimating a time period to a passenger compartment thermal comfort being outside of the thermal bandwidth, comparing the estimated time period to a time limit for maintaining thermal comfort, and requesting the engine restart if the estimated time period is less than the time limit.

5. The method of claim 4 further including step (i): if engine restart occurs, readjusting the at least one component of the HVAC system to an operating state prior to commencing the engine shut-off mode.

6. The method of claim 1 further comprising the steps of:
   (i) determining an engine temperature requirement;
   (j) determining an engine temperature parameter;
   (k) comparing the engine temperature parameter to the engine temperature requirement;
   (l) if the engine temperature parameter is greater than the engine temperature requirement, determining that a heating engine shut-off requirement is satisfied; and
   (m) if the heating shut-off requirement is satisfied and the vehicle is in the allowable engine off mode, commencing engine shut-off operating mode.

7. The method of claim 6 wherein step (h) is further defined by: estimating a time period until the engine temperature parameter is less than the engine temperature requirement; comparing the estimated time period to a time limit for maintaining thermal comfort, and requesting the engine restart if the estimated time period is less than the time limit.

8. The method of claim 7 further including step (o): if engine restart occurs, readjusting the at least one component of the HVAC system to an operating state prior to commencing the engine shut-off mode.

9. A method of controlling a HVAC system for a hybrid vehicle, the method comprising the steps of:
   (a) determining an engine temperature requirement;
   (b) determining an engine temperature parameter;
   (c) comparing the engine temperature parameter to the engine temperature requirement;
   (d) if the engine temperature parameter is greater than the engine temperature requirement, determining that a heating engine shut-off requirement is satisfied;
   (e) if the heating shut-off requirement is satisfied and the vehicle is in an allowable engine off mode, commencing an engine shut-off operating mode;
   (f) if the heating engine shut-off requirement is satisfied, adjusting at least one component of the HVAC system to maximize heating of a passenger compartment with minimum energy usage prior to commencing the engine shut-off mode; and
   (g) if the engine shut-off mode is commenced, monitoring the HVAC system to determine when engine restart is needed to maintain thermal comfort in the passenger compartment.

10. The method of claim 9 wherein step (g) is further defined by: estimating a time period until the engine temperature parameter is less than the engine temperature requirement; comparing the estimated time period to a time limit for maintaining thermal comfort, and requesting the engine restart if the estimated time period is less than the time limit.

11. The method of claim 10 further including step (h): if engine restart occurs, readjusting the at least one component of the HVAC system to an operating state prior to commencing the engine shut-off mode.

12. The method of claim 9 wherein step (a) is further defined by detecting an ambient temperature around the vehicle and detecting a coolant temperature for coolant in the engine when determining the engine temperature requirement.

13. The method of claim 9 wherein step (b) is further defined by detecting an engine oil temperature when determining the engine temperature parameter.

14. The method of claim 9 wherein step (f) is further defined by adjusting at least one of a blend door upstream of a heater core, a speed of a HVAC blower, a recirculation door and a mode door.

15. The method of claim 9 further comprising the steps of:
   (h) determining a requested air conditioning operating point for the passenger compartment;
   (i) estimating a time to reach the requested air conditioning operating point;
   (j) based on steps (h) and (i), estimating a maximum allowed compressor off time;
   (k) determining if the maximum allowed compressor off time is greater than a minimum allowed engine off time;
   (l) if the maximum allowed compressor off time is greater than the minimum allowed engine off time, determining if the vehicle is entering the allowable engine off mode; and
   (m) if the vehicle is in the allowable engine off mode, commencing the engine shut-off mode.

16. The method of claim 15 further including: (n) if the vehicle is in the allowable engine off mode, adjusting at least one component of the HVAC system to maximize cooling of the passenger compartment with minimum energy usage prior to commencing the engine shut-off mode.

17. The method of claim 16 wherein step (n) is further defined by adjusting at least one of a blend door upstream of a heater core, a speed of a HVAC blower, a recirculation door and a mode door.

18. The method of claim 15 further including: (n) if the engine shut-off mode is commenced, determining a comfort operating thermal bandwidth based on a HVAC operating mode, estimating a time period to a passenger compartment thermal comfort being outside of the thermal bandwidth, comparing the estimated time period to a time limit for maintaining thermal comfort, and requesting the engine restart if the estimated time period is less than the time limit.

* * * * *